US010580315B2

(12) United States Patent
Schupp et al.

(10) Patent No.: US 10,580,315 B2
(45) Date of Patent: *Mar. 3, 2020

(54) METHOD AND SYSTEM FOR PILOT TARGET AIRCRAFT AND TARGET OBSTACLE ALERTNESS AND AWARENESS

(71) Applicant: Beeper Avionics Inc., Denver, CO (US)

(72) Inventors: Christopher Schupp, Lafayette, CO (US); Jay David Marks, Westminster, CO (US)

(73) Assignee: Beeper Avionics Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,948

(22) Filed: Jun. 26, 2019

(65) Prior Publication Data

US 2019/0333398 A1 Oct. 31, 2019

Related U.S. Application Data

(63) Continuation of application No. 16/166,069, filed on Oct. 20, 2018, now Pat. No. 10,373,506, which is a (Continued)

(51) Int. Cl.
*G08G 5/04* (2006.01)
*G01S 13/93* (2006.01)
(Continued)

(52) U.S. Cl.
CPC .......... *G08G 5/045* (2013.01); *G01S 13/9303* (2013.01); *G01S 19/03* (2013.01);
(Continued)

(58) Field of Classification Search
CPC .... G08G 5/045; G08G 5/0008; G08G 5/0013; G08G 5/0021; G08G 5/0078;
(Continued)

(56) References Cited

U.S. PATENT DOCUMENTS 6,101,431 A * 8/2000 Niwa ...................... G01C 11/00
340/980
6,348,877 B1 * 2/2002 Berstis ................. G01C 23/005
340/961

(Continued)

OTHER PUBLICATIONS

Non-Final Office Action in U.S. Appl. No. 16/166,069, dated Jan. 3, 2019.

*Primary Examiner* — Sisay Yacob
(74) *Attorney, Agent, or Firm* — Cognition IP, P.C.; Bryant Lee

(57) ABSTRACT

There is provided systems and methods for pilot alertness and awareness of target aircraft and target obstacle that are flying within a proceeding flight path collision. Transmitted guiding sound signals consisting of three dimensional effects and tonal sounds are generated by a flight unit, and sent to the pilot's headset for the desired purpose of directing the pilot's head position to locate the target aircraft and target obstacle. The flight unit processes time of collision from received target aircraft broadcast, and contain at least GPS data and target obstacle information from stored navigational maps. The flight unit further receives the pilot's head position through means of a head tracker. Furthermore, the flight unit is able to perform the functions of, storing piloted flight information, voice language instruction, flight assisted notification, and communicating with one or multiple mobile devices such for the information to be displayed visually, and is upgradable remotely.

20 Claims, 6 Drawing Sheets

Related U.S. Application Data continuation of application No. 15/260,287, filed on Sep. 8, 2016, now Pat. No. 10,140,878.

(60) Provisional application No. 62/216,901, filed on Sep. 10, 2015.

(51) Int. Cl.
*G01S 19/03* (2010.01)
*G08G 5/00* (2006.01)
*G01S 19/13* (2010.01)
*G01S 19/14* (2010.01)

(52) U.S. Cl.
CPC ............ *G01S 19/13* (2013.01); *G08G 5/0008* (2013.01); *G08G 5/0013* (2013.01); *G08G 5/0021* (2013.01); *G08G 5/0078* (2013.01); *G01S 19/14* (2013.01)

(58) Field of Classification Search
CPC ...... G01S 13/9303; G01S 19/03; G01S 19/13; G01S 19/14
See application file for complete search history.

(56) References Cited

U.S. PATENT DOCUMENTS

| | | | |
|---|---|---|---|
| 9,318,025 B2* | 4/2016 | Conner | G08G 5/065 |
| 9,390,559 B2* | 7/2016 | Feyereisen | B64D 45/00 |
| 2014/0267422 A1* | 9/2014 | Feyereisen | B64D 45/00 |
| | | | 345/634 |
| 2015/0170525 A1* | 6/2015 | Conner | G08G 5/065 |
| | | | 701/3 |

* cited by examiner

METHOD AND SYSTEM FOR PILOT TARGET AIRCRAFT AND TARGET OBSTACLE ALERTNESS AND AWARENESS

CROSS REFERENCE TO RELATED APPLICATION

This application is a continuation of application Ser. No. 16/166,069, filed Oct. 20, 2018, which is a continuation of application Ser. No. 15/260,287, filed Sep. 8, 2016, which claims the benefit of priority of provisional application: Ser. No. 62/216,901, filed on Sep. 10, 2015.

BACKGROUND OF THE INVENTION

The field of invention relates to methods and systems for pilot collision alertness and awareness of an aircraft and object in a flight collision path. In a particular, the present invention relates to systems and methods for using sound signals to direct the pilot's head position for the pilot to locate the aircraft and object in the flight collision path. In particular, the present invention relates to a system of flight unit that determines and generates the sound signals into the pilot's headset to direct the pilot's head position for the pilot to locate the aircraft and object in the flight collision path, and thereby processes received aircraft, head tracker sensory, and stored target obstacle map information. In a further particular, the present invention relates to methods and systems to graphically display three dimensional guidance information, such as a three dimensional arrow, shown on a mobile electronic device to direct the pilot's head position for the pilot to locate the aircraft and object in the flight collision path, and thereby the mobile electronic device processes received information from the flight unit, and further thereby the flight unit processes received aircraft, head tracker sensory, and stored target obstacle mapping information. The mobile electronic device herein is a portable computing device and may be wearable as known to those skilled in the art.

In general, pilot collision alertness and awareness systems and software applications thereof are for the purpose to avoid aircraft and obstacle collisions, and whereby to provide safety measures for the pilot to better navigate the airspace. This is necessary as the airspace environment ever more so becomes increasingly crowded, particularly with drone aircraft. Beneficially, pilot collision alertness and awareness systems and software applications thereof process all this information for the pilot. They detect and monitor aircraft and obstacles that may or do enter a flight collision path. And, notify the pilot in such a way for the pilot to react accordingly as to the degree of collision danger. This includes the pilot to maneuver their aircraft to avoid collision or possibly communicate with other aircraft in the collision path.

As used herein, unless specified otherwise "target aircraft" means an aircraft that is piloted or is unmanned that enters a predetermined collision path, such that, if unchanged, will lead to a collision.

As used herein, unless specified otherwise "target obstacle" includes terrain, such as, ground, mountain, ocean, and the like, and ground obstacles, such as, towers, wires, structures, and the like, and restricted airspace, such as, airport and military zones, and the like.

As used herein, unless specified otherwise, the "navigation map" contains information of target obstacle information, and additionally, nearby airports, airspace, airport information, nearby cities, landmarks, minimum recommended altitudes, restricted zones, and the like.

As used herein, unless specified otherwise "time of collision" means a resulting predetermined time that the target aircraft or target obstacle collision will occur if both remain on the same course. This, for example, a jet aircraft having the same time of collision as a small propelled aircraft of lesser collision path magnitude, because when accounting for the jet aircraft having a greater velocity.

As used herein, unless specified otherwise, a "flight unit" should be given its broadest possible meaning, or of any other terms commonly used or known in the art, and include the following: receiving signal from surrounding aircraft, storing navigational map and target obstacle information, receiving/transmitting pilot guiding generated sound signals, sending and receiving verbal and wireless information; and, whereby processing the receiving and of the stored information for the purposes without limitation of, calculating time of collision, verbal system configuration and feedback, and information to transmit to the mobile electronic device to visually display the information graphically.

As used herein, unless specified otherwise, a "controller" should be given it's broadest possible meaning, or any other terms commonly used or known in the art, and include any computer that reads/writes to memory, at least one processor, and operating software that is programmable to operate. The controller is capable of supporting broadcast signal protocol from varying receivers. This, for example, is Wi-Fi, Ethernet port, Bluetooth, Mode C, Mode S, Mode 3A or A, ADS-B and of further ground station broadcast TIS-B, ADS-R, and the like, understood by those skilled in the art.

In the conventional ways of target aircraft collision alertness and awareness, the pilot reads a graphical display that describe the properties of one or multiple target aircraft on a collision path. These systems may additionally use verbal indicators from/into the pilot's headset, and include information of target aircraft heading, avoidance maneuvering instructions, such as move up or down, and sounds to notify the pilot there is a target aircraft and to alert the pilot to read the visual display graphically showing the collision information of the target aircraft and target obstacle. And, wherein, the properties of the graphical display of target aircraft and target obstacle of without limitation may be vertical speed, relative position, navigation map information, and flight course.

There are however drawbacks of the said conventional ways of present for target aircraft collision alertness and awareness systems and software applications thereof. The pilot reading the visual display to identify the target aircraft and target obstacle location may be subsequently consuming and complicated to interpret during the time of collision scenario. When the pilot receives target aircraft and target obstacle verbal indicators, this information received by the pilot further can be confusing when having to locate the target aircraft or target obstacle. Thus, there is a need for the pilot to locate the target aircraft and target obstacle being simpler and more intuitive. The present invention addresses the described needs by means of generated sound signals in the pilot's headset, which particularly consist of guiding three dimensional effects and tones, to direct the pilot's head position for the pilot to locate the one or multiple target aircraft and target obstacles in an intuitive manner.

Thus, the present invention addresses and provides solutions to these and other needs in collision alertness and awareness by systems of a flight unit to determine the receiving target aircraft and target obstacle information being stored in navigational maps, as well as, the pilot's head position through the use of a head tracker sensory unit that navigates the pilot's head position, of which to generate the appropriate sound signals guiding the said pilot's head position for the pilot to locate the one or multiple target aircraft and target obstacles. The present invention further addresses the flight unit being multi-purpose. This include the capability of speech language processing, so that the pilot is able to configure the time of collision and properties of the generated sound signals using verbal commands, and data to be visually displayed on at least one mobile electronic device. Additionally, for the flight unit to capture flight information by means of navigational sensors to record the pilot's flight behavior, and moreover, to provide flight assisted feedback. The present invention yet further addresses the flight unit to communicate with at least one mobile electronic device, whereby providing graphical representation guidance methods to direct the pilot's head position for the pilot to locate one and multiple target aircraft and target object.

SUMMARY OF THE INVENTION

It is desirable to develop systems and methods to provide a pilot as a means of using sound signals for guidance into the pilot's headset to direct the pilot's head position to locate one or multiple target aircraft and target obstacle, and in such a way for the pilot thereby to react instinctively. More particularly, it is desirable for the flight unit system further to contain controlling and sensory elements to function multi-purpose, including of receiving verbal commands and indicators utilizing speech language processing, particularly to configure flight unit properties, including adjusting one or multiple times of collision, store sensory flight information, and providing flight assisted feedback. This to achieve the objective for which the pilot continues flying the aircraft without causal interruption. And, of the inventions, additionally, wherein the flight unit is able to communicate with at least one mobile electronic device through means of wireless connectivity, and from received information that is processed by the flight unit. The thereby information processed is of at least receiving target aircraft information and stored navigational maps containing target obstacle, as well as, the pilot's head position through the means of a head tracker sensory unit tracking the pilot's head position. This further include sensory information and speech language commands, which are visually displayed on the mobile electronic device, and wherein at least one guidance information, such as a three dimensional arrow, guiding the pilot's head position for the pilot to locate one or multiple target aircraft and target obstacles. The present inventions, among other things, solves these needs by providing the systems and methods taught herein.

Thus herein is provided are flight collision and awareness systems and methods for the pilot to track at least one target aircraft and target obstacle, wherein having a flight unit that contains a broadcast receiver described herein of radar, radio, laser, and the like collecting and interpreting standard aircraft broadcast signal of said protocol, and other non-radar wireless broadcast signal, such as Wi-Fi, and Wi-Lan, and those known to those skilled in the art; the flight unit further contain the elements of at least one controller, whereby the controller identifies surrounding aircraft, processes the aircraft information, and determine if the aircraft is within a time of collision; there is a head tracker unit affixed to the pilot's headset or pilot's head garment and glasses consisting of sensors to determine the position of the pilot's head, and transmits this information to the flight unit; the flight unit calculates the direction of motion for the pilot's head to move so it locates the target aircraft, and then sends a sound signal to an audio synthesizer element that produces a particular sound signal in the pilot's headset channel indicative of the motion to direct the pilot's head position to move in such a way for the pilot to the locate the target aircraft and target obstacle.

This system and methods wherein the flight collision and awareness flight unit generates sound signals consisting of three dimensional sound effects to guide the pilot's headset position to the location of the target aircraft and target obstacle that is ear specific to right and left or both; further this sound signal provides guidance to each ear specific when the target aircraft and target obstacle location is ahead or behind the pilot's head position; the type of sound signal may additionally indicate multiple aircraft based on a time of collision of first aircraft or obstacle, second aircraft or obstacle and so forth aircraft and obstacle; the sound signal further may produce a tone that changes in intensity volume for directing the pilot's head position when the target aircraft and target obstacle is ahead or behind to location.

There is provided an embodiment of the flight collision and awareness systems and methods, wherein the flight unit further generates tones that have variations, including tone modulation, such as a tremolo effect, phase such as a Doppler effect, to indicate ahead or behind of the target aircraft and target obstacle location.

Additionally, these system and methods wherein the flight collision and awareness having a flight unit that hereby processes received target aircraft and surrounding aircraft, the head tracker sensory, and stored target obstacle map information; and containing a controller element that stores this information, performs calculations, and is able to communicates wireless with at least one mobile electronic device by means of Bluetooth; there may be further one or multiples sensors to collect the flight information; these informations are visually displayed by the mobile electronic device, whereby the information is three dimensional guidance information, such as three dimensional arrow to guide the pilot's head position to the one or multiple target aircraft and target obstacles.

There is yet provided an embodiment of the flight collision and awareness systems and methods wherein the pilot's head position is simultaneously guided by means of both sound signals and visually displayed on a mobile electronic device to locate the target aircraft and target obstacle; the sound signals are sent from the flight unit into the pilot's headset, and the flight unit further transmits to the mobile electronic device the processed flight unit information of directing the pilot's head position to the location of the target aircraft and target obstacle; and this is visually displayed by means of three dimensional guidance information, such as a three dimensional arrow shown by the mobile electronic device.

There is yet further provided an embodiment of the flight collision and awareness systems and methods wherein the information is sent to/from the mobile electronic device and flight unit; this may be flight aircraft information, target aircraft information, weather, and flight assisted information, navigational maps, and controlling the configurations of one or multiple times of collision; that is graphically displayed by the mobile electronic device and further capable of speech language processing of verbal commands to change the configurations of the flight unit, provide flight assisted information; and additionally, the mobile electronic device is capable of sending head tracker sensory information of the mobile electronic device as part of the flight unit receiving data, flight GPS data, and the like; and moreover, perform interpolation of the flight GPS data to determine the pilot's head position relative to the aircraft, this for example, the pilot is viewing in their line of sight out the cockpit to the ground of the passengers seat, at the instrument panel, and backwards.

The flight collision and awareness methods and systems wherein the flight unit contains sensory element devices; these capture flight aircraft data by means of at least one sensor connected to at least one controller; the flight aircraft data include flight coordinates, flight pattern, identifier, flight behavior characteristic, and the like; the flight aircraft data may be stored, deciphered, interpreted, and computed, and this information may be sent to/from the controller to a mobile electronic device by means of wireless communication for purposes to visually display flight information, including data analysis of target aircraft and flight information.

These systems wherein the flight collision and awareness system of the flight unit may employ a tunable physical knob as a means for adjusting at least one time of collision of target aircraft and target obstacle, whereby the physical knob is a tunable switch causing the controller to thereby adjusted the time of collision.

There is provided an embodiment of the flight collision and awareness system of the flight unit having the elements of voice recognition system, including at least one microphone, and language processing chip, as this is in addition to producing sound signals wherein, the controller is connected to the voice recognition chip; the controller interprets these verbal commands to perform at least tasks and supplies data; the task of supplied data may comprise of reading sensory data, and/or data providing calculation, identify target aircraft characteristics; the characteristics may be heading, target aircraft magnitude, and time of collision; and, further the flight information is assisted flight data; this information is verbally sent to the pilot for the purpose of flight behavior correction, heading position, and configuration of flight unit; this information is sent from the controller to the audio synthesizer, or directly from the voice recognition chip to the audio synthesizer.

There is further provided an embodiment of the flight collision and awareness system of the flight unit, wherein the flight assisted data is collected by the said flight unit sensors and information from at least one sensor element, and communicated wireless by means of Bluetooth, and the like, from a mobile electronic device: the data collected may include, real-time mapping data, including without limitation, LIDAR, at least one camera or a combination of these; the flight unit is programmed to determine from this, and stored flight behavior navigation maps, and from real-time collected data, such as location of target obstacles, weather conditions, landing approach, take-off, and pilot heading the flight assistance data; and further this data may be visually displayed by a mobile electronic device.

Moreover, the forgoing systems and methods may also employ a head tracker comprising of at least a compass, battery, and transmitter; and may further comprise of a yaw sensor and inertial measurement unit. The head tracker may include at least a laser, photo-emitter, such as infrared diodes, and photodetectors as part of or affixed to the pilot's headset, head garment, glasses, a head unit mobile electronic device, or portable mobile electronic device.

Yet moreover, the forgoing systems and methods may further be affixed, and comprise of a group of at least one Velcro, fastener, snap, and adhesive.

And, yet moreover, the forgoing systems and methods may be powered using a battery for the flight unit, any elements of the flight unit, and the head tracker unit; and, these systems and methods yet may employ power from the aircraft itself, and yet these systems and methods may further employ at least one solar cell and inverter.

One of ordinary skill in the art will recognize, based on the teachings set forth in these specifications and drawings, that there are various embodiments and implementations of these teachings to practice the present invention. Accordingly, the embodiments in this summary are not meant to limit these teachings in any way.

DESCRIPTION OF THE DRAWINGS AND THE PREFERRED EMBODIMENTS

In general, the present inventions relates to systems and methods for use in pilot traffic alertness and awareness using sound signals in the pilot's headset for the pilot's head position to be guided to the target aircraft and target obstacle location. The pilot to locate the target aircraft using sound signals in the pilot's headset is instinctive and seamless, this is because the present invention provides sound signals that are of a natural neuro-stimuli for the pilot to comprehend in guiding the pilot to locate the target aircraft and target obstacle. This by the use of sound signals consisting of three dimensional audio effects and tonal sensations. In particular, the systems and methods of the pilot traffic alertness and awareness is a flight unit of controlling and sensory elements that generate appropriate sound signals, and thereby process the pilot's head position, receiving aircraft and stored navigational map target obstacle information; and additionally sending information to at least one mobile electronic device for the purpose of visually displaying guiding information directing the pilot's head position for the pilot to locate the target aircraft and target obstacle. Further, the use of verbal speech language feedback, whereby the pilot speaking into the pilot's headset to configure the flight unit properties, and further visually displaying mobile electronic device information, and collision awareness and alertness sound signal capability, and thus making the flight unit system multi-purpose. The present inventions, among other things, solves these needs by providing the systems and methods taught herein.

Figure 1:
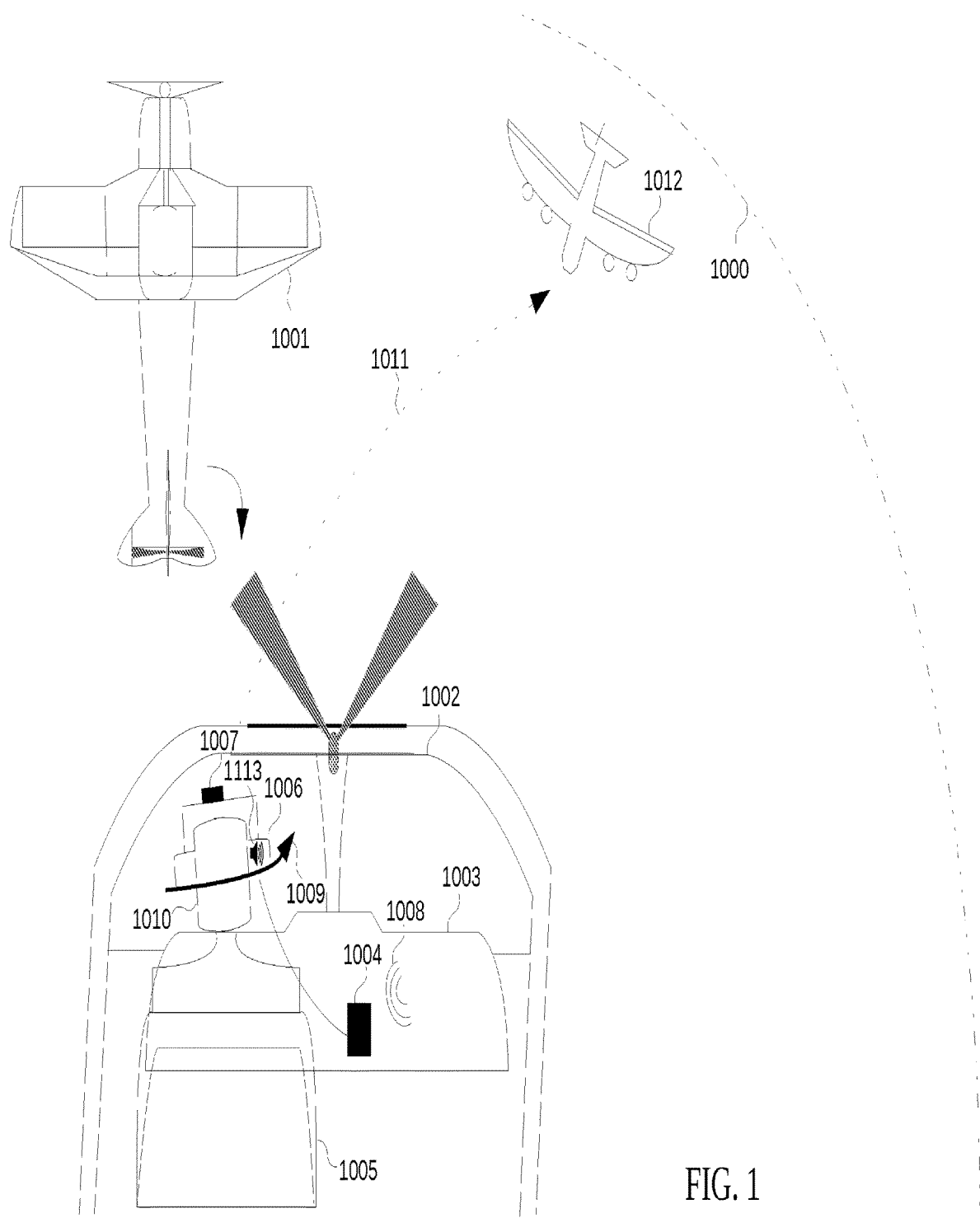
FIG. 1 is a graphical representation of an example of a system of the present invention of a pilot's head position guided for the pilot to the location of a target aircraft using sound signals.

Thus, in general, and by way of example, there is provided in FIG. 1 a target aircraft 1012 flying within a time of collision 1000 depicted by a virtual 360 degree airspace zone. The calculation for time of collision by example may be linear, bilinear interpolation, nonlinear interpolation, simultaneous localization and mapping techniques. Wherein, the data is received from the target aircraft broadcast including Doppler, GPS, and navigation and depth sensory information, and additionally without limitation, of other means, such as rotation, gravitation, angular velocity, pitch, roll, magnetic, optical, electromagnetic signal strength, acceleration, and the like, known by those skilled in the art.

FIG. 1 further provides a perspective view showing the aircraft 1001 the aircrafts cockpit 1002, and with a portable flight unit 1004 that is placed in the on instrument panel 1003, and receives requested aircraft signal 1008 received by the said flight unit of a target aircraft 1012. This flight unit is at least calculating for the time of collision, and capturing and interpreting the head tracker 1007 of the pilot's head position 1010 from sensory information, whereby the said head tracker is affixed to the pilot's headset 1006. The said flight unit receives the pilot's head position from the head tracker, and determines the target aircraft location 1011, and thus where the pilot's head position must be directed to locate the target aircraft 1009. The flight unit then generates sound signals 1113 in the pilot's headset directing the pilot's head position for the pilot 1110 to locate target aircraft location. The said directing pilot's head position is further of a 360 degree motion for the pilot to locate the target aircraft.

Figure 2:
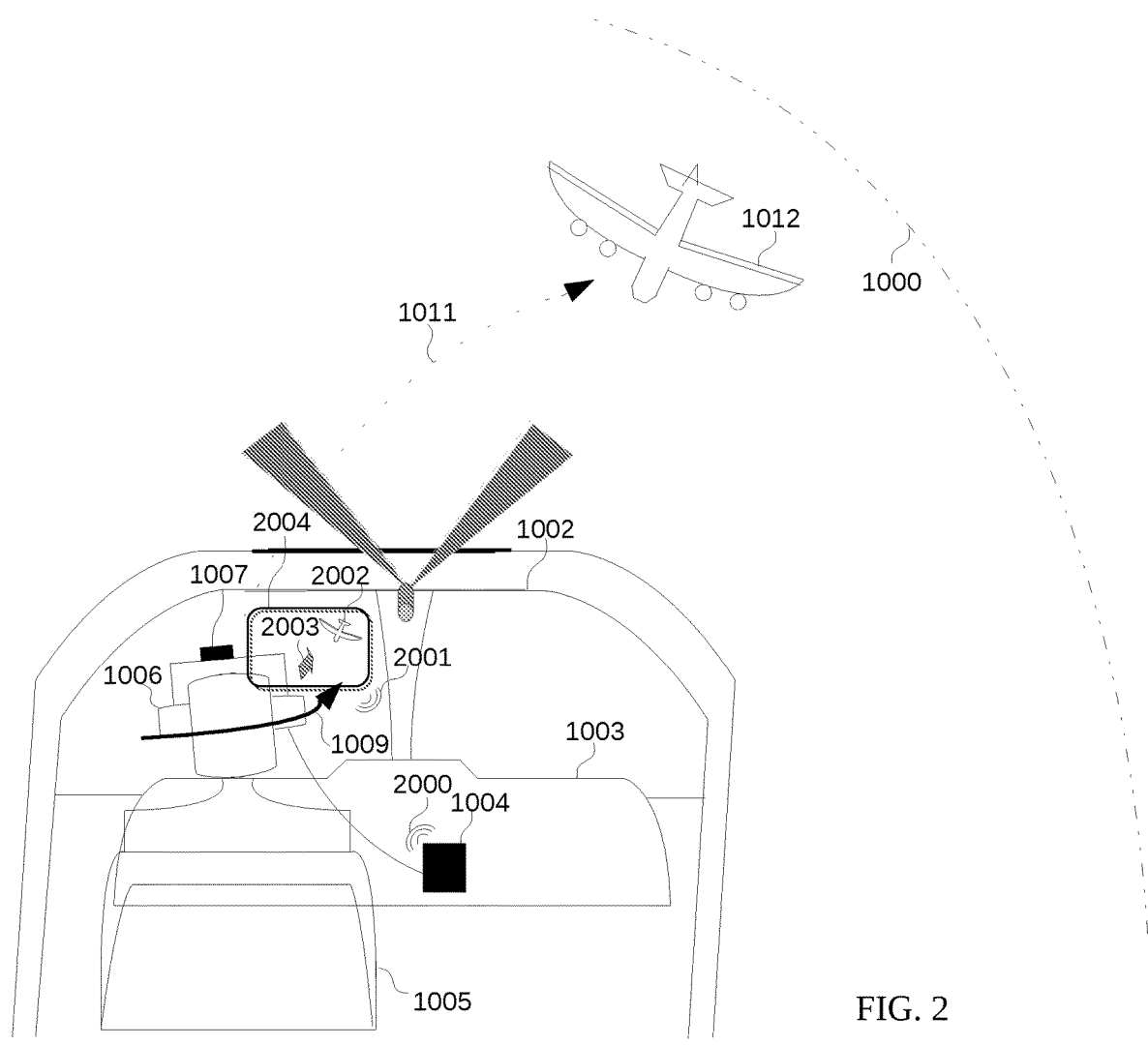
FIG. 2 illustrate the pilot locating a target aircraft from a visual display in communication with a flight unit.

Moreover, FIG. 2 presents further the head tracker 1007 communicating with the flight unit 1004 in the cockpit 1002 and a target aircraft 1012 has entered the time of collision 1000 from FIG. 1, wherein the said flight unit receives the data of the pilot's head position 1009 from the head tracker 1007 affixed to the pilot's headset 1007 and determines the location and time of collision of the target aircraft 1011. This information is communicated wireless to 2000 the mobile electronic device 2004 to indicate the direction of aircraft using a 3 dimensional arrow 2003 and displayed pop-up location of the aircraft 2002 on the mobile electronic device display, and wherein the mobile electronic device communicates 2001 with the flight unit. Further other electronic devices may be employed, by way of example, such a project, transparent electronic display, and the like known to those skilled in the art may be used.

A first aspect, by way of non-limiting example, relates to the type of sound signals 1113 consisting of three dimensional sound effects and tonal sensations generated by the flight unit 1004, and the sound signals are heard in the pilot's headset 1006 as illustrated exemplary in FIGS. 1-2 to locate at least one target aircraft 1000. The three dimensional sound effect may be the same and varying intensity and same and varying with reverberations in the pilot's headset. The three dimensional sound effect is calculated by the said flight unit using a means of calculating at least one head-related transfer function, using filters, and z-transform, Fourier transform of single and multidimensional, the frequency response of the system, and the like known by those skilled in the art. The three dimensional effecting sound signal in produced in accordance for the pilot to locate the target aircraft and target obstacle to each ear side. The three dimensional audio effect is interpreted to indicate to the sound location registered by the brain, wherein this may be of about eight side sounds in each ear with a such as front, right, front left, left, rear leaf, rear, and rear right directions, from about 16 side sounds in ear, from about 32 sounds in each ear, and, and about 32 sound or more in each ear. The three dimensional effect may vary by verbal sound with three dimensional effect, tonal sensation, and multiple verbal sounds and tonal sensations or a combination of these to indicate the target aircraft and target obstacle location in the pilot's headset.

As a further embodiment, the sound of pilots of two or more aircraft on a collision course, wherein each are notified by the said three dimensional effect sound signals in the pilot's headset, and where each pilot is to fly the aircraft to avoid collision in a predetermined time of collision and heading of the other aircraft. The flight unit can automatically communicate with another flight unit to coordinate the heading of each aircraft of the other pilot by means of receiving guiding sound signals in the headset to avoid the collision path of both aircraft. They may also be notified by sound signals to locate the other pilot's head direction and notification of directions to avoid one or multiple aircraft and obstacle direction using multiple three dimensional effects, tonal sensations, or a combination of these. In addition, if the flight unit is part of a drone, the drone is flown automatically by the flight unit once a predetermined flight collision is known, and the piloted aircraft receives guiding sound signals as to where to fly. This is not within limitation of flight, but aircraft taxiing, takeoff, and landing.

And, by way of example, the mobile electronic device graphically displays information from at least one three dimensional arrow signal directing the pilot's head position to the location of one and multiple target aircraft and target location. This may further be combined with sound signals into the pilot's headset to locate the one and multiple target aircraft and target location. The graphically displayed information from the flight unit further may include relevant flight information, target aircraft information, weather, navigational maps, and controlling the configurations of one or multiple time of collision that is graphically displayed by the mobile electronic device. This may be further capable by means of verbal commands to change the configurations of the flight unit stored by the mobile electronic device. This is of benefit particularly for heads up display, and augmented reality glasses, and use of portable computers, like smartphones to hold up and see information with quick visual response. And, as yet a further embodiment, pilot to locate two or more on a collision course, as each are notified by visual display, such as one or multiple three dimensional arrow, where each pilot is to fly the aircraft to avoid collision in a predetermined time of collision and heading of the other aircraft. They may additionally be also notified by sound signals to locate the target aircraft and target obstacle.

Systems and methods may further generally include one or more sound signals to indicate multiple target aircraft and targets obstacle one and thus multiple times of collision. The pilot is capable of receiving the sound signal consisting of three dimensional sounds and tones to indicate a first target aircraft and target obstacle, and a second sound signal to indicate a second, and so forth to indicate target aircraft and target obstacle. The configuration of the systems and methods further may have a single and multiple beeps to indicate a second aircraft, third aircraft, and so forth of target aircrafts and target obstacles within the time of collision. As an embodiment of the systems and methods, the pilot may configure verbal commands, whereby the flight unit contains voice recognition capability to define the sound signal and beep for target aircraft and target obstacle. As a second embodiment, the pilot can predetermine multiple sound signals and beeps for one and multiple time of collisions of target aircrafts and target obstacles. The methods and systems may have a set predetermined non-adjustable time of collision for safety of about 5 seconds, of about 10 seconds, of about 30 seconds, of about 1 minute, of about 3 minutes, and more than 3 minutes.

And, yet further the sound signal may further be discontinuous to allow the pilot to recognize more than one signal being sent in the pilot's headset indicating more than one target aircraft and target obstacle. The discontinuity of sound signal may be of about 1 second, of about 3 second, of about 5 second, of about 20 seconds, and more than 20 seconds. The discontinuity of the sound signal may have verbal information from the methods and systems, and of the following: verbal description of the sound signal, identification of target aircraft and target obstacle, meaning of the sound signal, such as target aircraft identified, and time of collision, and the like sent the pilot's headset during the discontinuity between sound signal, which does not produce a three dimensional sound.

In addition the sound signal providing target location guidance for the pilot in the pilots headset are tonal sensations. The tone properties may be a variation in intensity of modulation, such as a tremolo effect, variation in phase, or a combination of these. The tremolo effect, for example, is stronger when the pilot's head position is turned to the location of the target aircraft and target obstacle, and weaker when turned away as the signal will grow weaker.

And, further in addition, in accordance with one or more aspects of the systems and methods, the sound signals indicate flight assisted behavior. The said sound signals consisting of three dimensional audio effects, tone, and mixed verbal commands, or a combination thereof offering flight notification instructions. This for example, landing and aligning with the airstrip as the aircraft is needed to be tilt based on navigational stored maps and possibly camera and LIDAR information, wherein the sound signal intensity is three dimensional to indicate the airplane movement without having to visualize instrument data with verbal commands, such as move the aircraft left, and as the pilot moves the aircraft left, the sound signal grows weaker when reaching the right alignment position. The flight assisted information is without limitation to additionally being graphically displayed by a mobile electronic device transparent display, and projector with the said sound signals.

Figure 3:
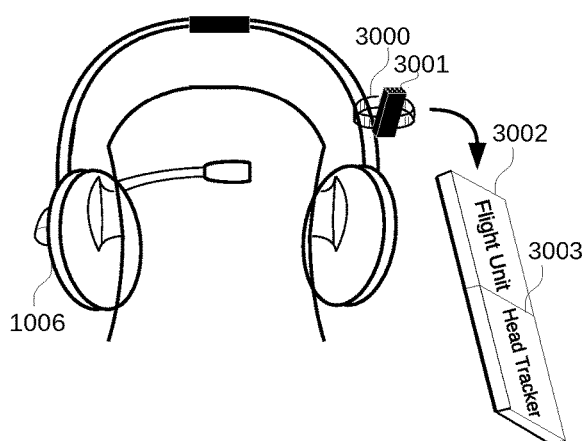
FIG. 3 illustrate exemplary a flight unit affixed to a headset as a pilot's head position is guided for the pilot to the target aircraft.

As a second aspect, the flight tracking and awareness methods and systems relate to FIG. 3, wherein the flight unit 3001 is detachable and affixed 3000 to the pilot's headset 1006 and the head tracker unit 3003 connected to the flight unit 3002 is embedded to the flight unit to form a single unit. The head tracker as an embodiment of the second aspect, may be embedded in the mobile electronic device that is worn by the pilot.

The affixed systems and methods thereof of the flight unit, elements of the flight unit, and head tracker, and any other object are affixed by means comprising of Velcro, fastener, magnet, strap, and the like to the pilot garments, parts of the cockpit, and pilot's headset. Further of the methods and systems, the flight unit, head tracker, and aspects the flight unit may be affixed or embedded to and inside a mobile electronic device.

The systems and methods pertaining to an aircraft flight environment, the flight unit, head tracker, and any elements of the pilot traffic alertness and awareness system using sound signals in the pilot's headset directing pilots head position to locate target aircraft is to withstand flight environment vibrations, buffet, and flutter, and encased with such materials comprising of steel, plastic, titanium, and the like to also withstand flight vibration, buffet, and flutter.

The Flight Unit.

For systems of the general type illustrated in FIGS. 1-2, the pilot locates target aircraft by means of listening to directional sound signals generated in the pilot's headset, with at least the elements of a head tracker and flight unit to provide the pilot head position and target aircraft time of collision. The flight unit performs the desired functions of transmitting and receiving aircraft broadcast signal, storing data including without limitation wireless transmitted/received mobile electronic devices, receiving flight protocol signal of surrounding aircraft and navigational mapping data information, including target obstacles, and to perform calculations of the said information, and receiving and sending guiding sound signals into the pilot's headset, and further without limitation verbal commands and verbal information of flight information and assisted flight information. The flight unit in its simplest form of configuration comprises of the elements of a said broadcast receiver collecting and interpreting aircraft standard signal and new protocols including Wi-Fi, Wi-Lan, and the like known to those skilled in the art, and at least one controller, preferably a single board computer, generating sound signal in the pilot's headset, or sending the generated sound signal information to a mobile electronic device to generate the pilot's headset the sound signal, and an audio synthesizer, which may include at least one speaker.

Figure 4:
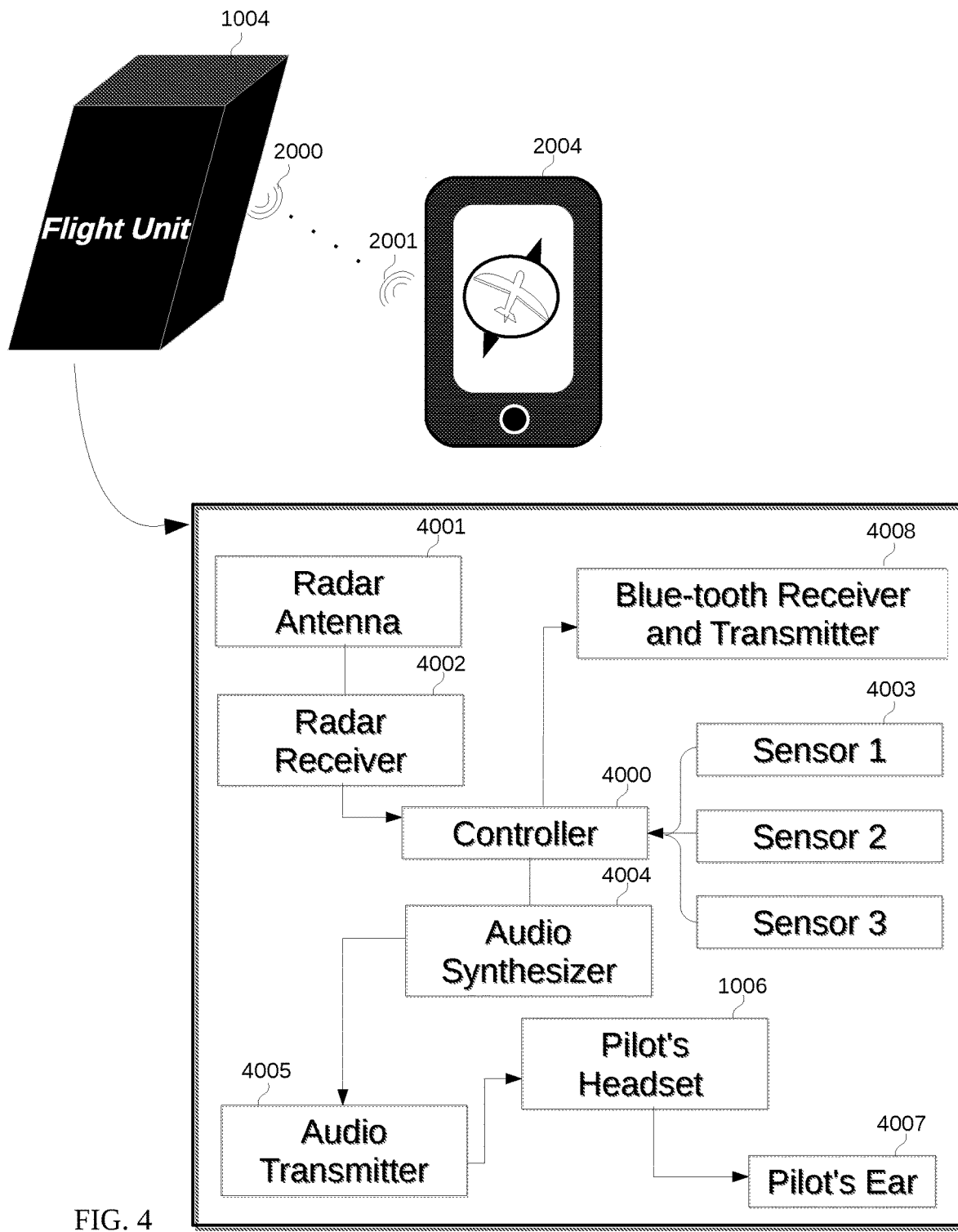
FIG. 4 is a schematic diagram example of a flight unit configuration.

For systems of the general type illustrated in FIG. 1, by way of example, the schematic diagram illustrated in FIG. 4 showing the flight unit 1004 communicating to the mobile electronic device 2000 and the mobile electronic device 2004 to communicate 2001 with the flight unit, wherein the flight unit elements comprise of a controller 4000 that serves as the central computer connecting multiple sensors 4003, and without limitation navigation sensors that include GPS, magnetometer, altimeter, yaw, accelerometer, gyroscope, compass, altimeter, air speed indicator, inertial reference unit, gimbal, and variometer; and non-navigational sensors that include at least one, voice recorder, microphone, voice recognition chip, sound chip, Wi-Fi receiver, Wi-Lan receiver, with an radio antenna 4002 to receive signal from the said controller and radio antenna 4001 to broadcast signal to request said aircraft receiving data, an audio synthesizer 4004 and transmitter 4005 to then send audio signal instructions to an audio synthesizer into the pilot's headset 1006 and thereby the pilot's ear 4007, and Bluetooth transmitter/receiver 4008 to said communicate with a mobile electronic device.

In accordance with one or more aspects of the flight unit system and methods, the flight unit additionally having the ability of a controller with the additional function of storing navigational mapping of data, specifically of target obstacles. The information provides the pilot a means for tracking target obstacles and generating sound signals when the target obstacles enters a time of collision. The flight unit may receive sensory data from other wireless mobile electronic devices, for example, a magnetometer, altimeter, yaw, accelerometer, gyroscope, compass, altimeter, air speed indicator, inertial reference unit, gimbal, and variometer, and other data, such as, navigation maps, weather, remote software changes/upgrades to provide information to pilot's that is verbal or use the information to generate sound signals based on the flight information feedback.

Figure 5:
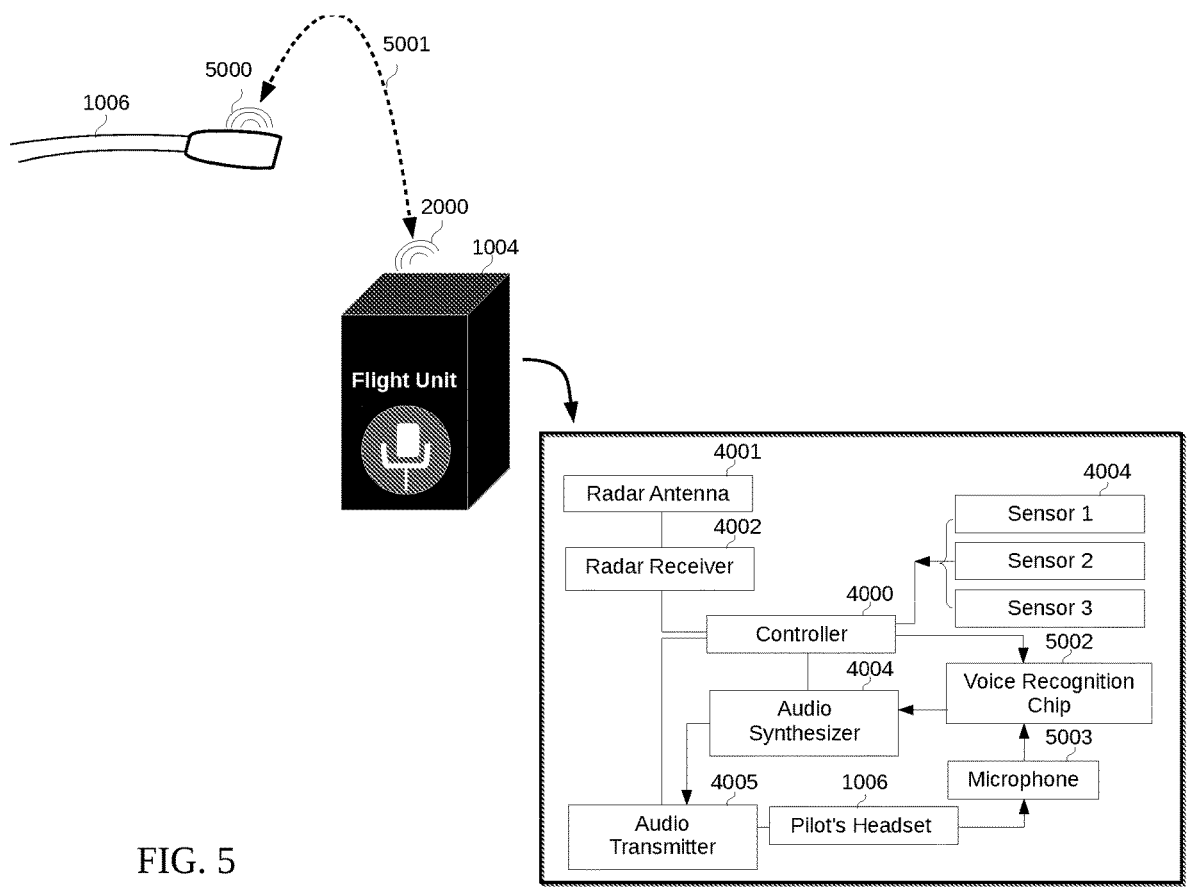
FIG. 5 is a schematic diagram of an exemplary flight unit configuration with speech language processing feedback.

There is further provided the flight unit having the capability of speech language processing of verbal information sent from/to the pilot's headset produced by the audio synthesizer from a controller, which may be connected to a speaker, microphone, and voice recognition processing integrated chip. A further illustrate of the flight unit with voice processing is shown in FIG. 5, wherein the pilot is able to speak in their pilot headset's 1006 and request by voice 5000 aircraft information 5001, including time of collision, identification of target aircraft, configuration of the flight unit software, and like to the flight unit 1004, which is able to send said aircraft information of particularly voice speech 2000. The flight unit includes further a voice recognition chip 5002 and microphone 5003 to receive voice from pilot from the flight unit shown in FIG. 4, processed by a controller 4000 with a radio antenna 4002 to receive signal from the said controller and radio antenna 4001 to broadcast signal to request said aircraft receiving data, an audio synthesizer 4004 and transmitter 4005 to then send audio signal instructions and additionally voice to an audio synthesizer into the pilot's headset 1006 and thereby the pilot's ear 4007, and Bluetooth transmitter/receiver 4008 to said communicate with a mobile electronic device. In this case, for example, the time of collision information may be processed from the pilot's voice commands, and displayed on mobile electronic device, as well as, piloted aircraft speed 5002, and data of target aircraft heading 5003. Further, the pilot may receive a verbal response from the flight unit triggered by the controller and sent from the audio synthesizer of FIG. 5. The said controller is able to provide the sound signals thereby to direct the pilot's head position for the pilot to locate the target obstacle from stored navigation data entering a predetermined time of collision of shown in FIG. 2.

Figure 6:
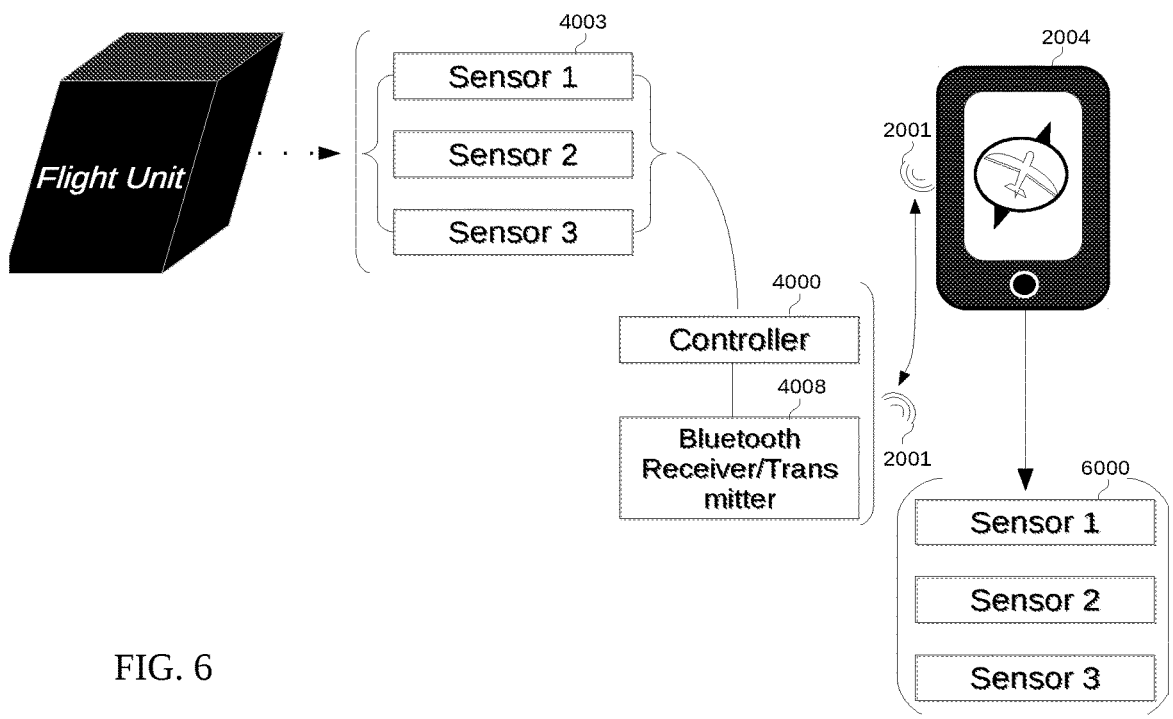
FIG. 6 illustrate a flight unit communicating it's sensory information with an external mobile electronic device.

In FIG. 6, is shown as an illustrate of the flight unit 1004 communicating wireless 2001 from a mobile electronic device 2004, and the transmitting and receiving sensory data of target aircraft 6000 and flight sensory information 4003 with a controller 4000 and Bluetooth receiver/transmitter 4008, with the information of sensory may be navigation data, voice commands, remote upgrades of the flight, and configuration of the flight unit.

In some further aspects of the flight unit systems and methods, the at least one controller element may receive target aircraft and flight information for a variety of other purposes and include without limitation the pilot analyzing pilot flight pattern, weather reports, flight heading, and to generate verbal and sound information into the pilot's headset for such purposes. This, for example, flight management information wherein, the pilot is verbally informed the direction to set a course, and further example of, the piloted aircraft descending too fast on approach of a landing and the pilot should check their decent pattern or to reduce decent rate.

It is thus the invention to remotely upgrade the software in the flight unit from a mobile electronic device by means of Bluetooth, this for example, the mobile app downloading a software upgrade in the software application, and to transfer the upgraded information to the flight unit software. The software mobile app may be upgraded to include new versions of software, such as weather display, notification information, flight information data graphs, and the like. The flight unit may be upgraded to include new speech processing, configuration of flight unit information, and the like.

It is readily understood in the art that the terms flight unit, as used herein is used in is used in its broadest terms and thus may also refer any elements are powered by at least one battery either part of the element or battery powering this and multiple elements.

The Head Tracker.

The head tracker in general performs the desired functions of determining the pilot's head position and comprising of navigation sensors of the simplest elements being a compass, transmitter to relay pilots head position information to the flight unit, and at least one source of power that hereby powered by at least one battery.

The present methods and systems and in particular the head tracker, may include further from the simplest elements without limitation at least one GPS, magnetometer, altimeter, yaw, accelerometer, gyroscope, compass, variometer, and the like, wherein the system element configurations to navigate the pilot's head position is known to those skilled in the art.

Figure 7:
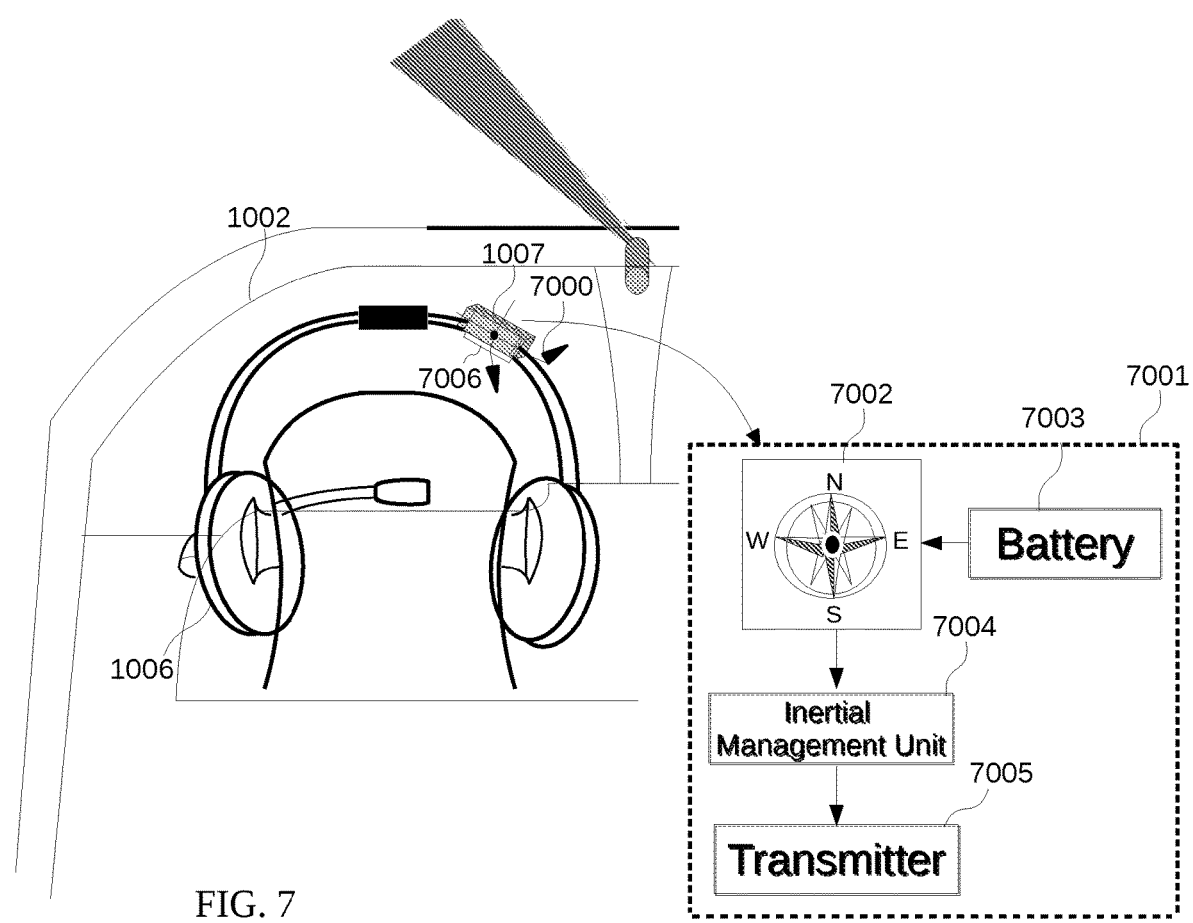
FIG. 7 schematic diagram exemplary of a head tracker sensory unit configuration.

Thus by way of example, as illustrated in FIG. 7 the head tracker 1007 is affixed 7006 to the pilot's headset 1006 with the unit transmitting to the flight unit 1004, wherein the said head tracker determine the direction of the pilot's head relative to the position of the aircraft 7000. The elements of the head tracker unit 7001 consist of a compass 7002, inertial measurement unit 7004, transmitter 7005, and powered by a battery 7003. The transfer of information to the flight unit is in the form of Bluetooth, Wi-Fi, Radio Frequency, or a combination of these.

Figure 8:
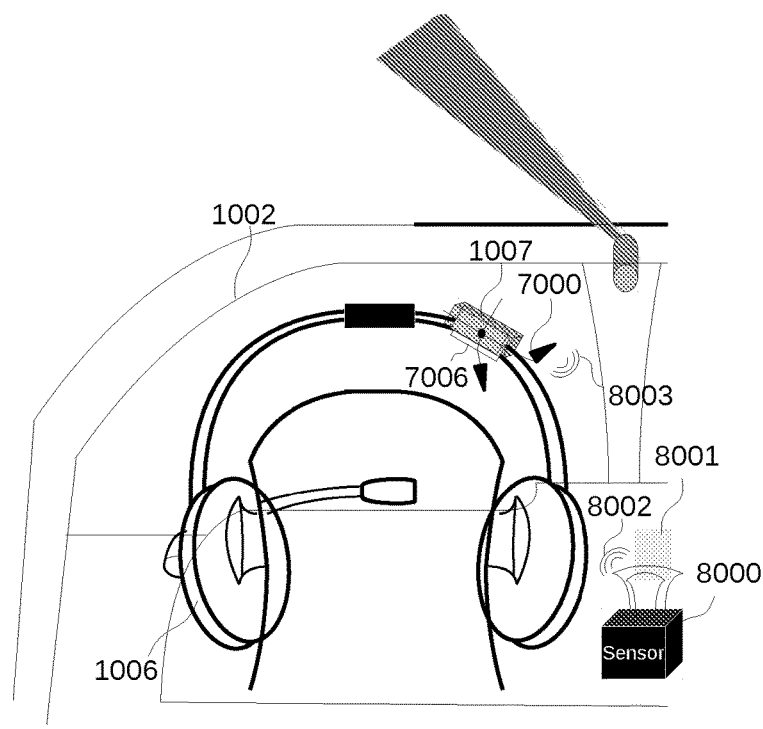
FIG. 8 illustrate the head tracker unit calibrated to the pilot's head position and airplane by means of an un-attached communicating sensor.

Furthermore, and by way of example, as illustrated in FIG. 8 from FIG. 7 of a head tracker 1007, the head tracker may communicate with an external sensor 8000 that communicates 8002 with the said head tracker affixed 8001 to the cockpit 1002, to determine the position of the aircraft and the said head tracker calibrates the position of the pilot's headset 1006 position to the said aircraft 7000 for the purpose of receiving the position of the pilot's head relative to direct the pilot by to measure the pilot's cockpit angular velocity around its vertical axis, wherein the head tracker is affixed 7006 to the said pilot's headset. The external may be at least a yaw sensor Yet furthermore, and by way of example, the head tracker may be embedded in the pilot's headset, mobile electronic device, affixed to the pilot's garment, and packaged in an augmented reality or heads up display, and the like.

The flight unit and mobile electronic device may test the head tracker to determine if the head tracker is removed from the pilot's headset by using software as a means to determine if the head tracker is producing a head motion and instructs a sound signal that is either a beep, verbal, or tone into the pilot's headset to affix the head tracker to the pilot's headset, low battery by communicating with the flight unit.

Figure 9:
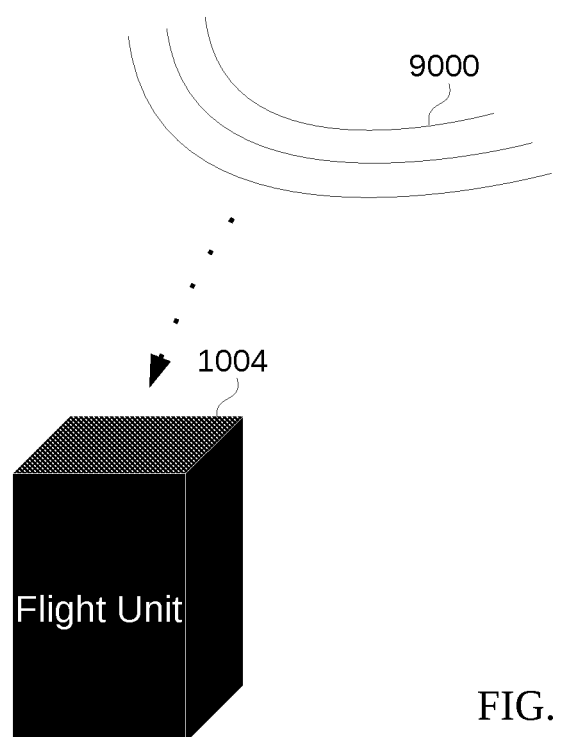
FIG. 9 illustrate the flight unit is receiving a non-standard aircraft protocol.

In FIG. 9, the flight unit 1004 is receiving a non-standard target aircraft protocol 9000 of Wi-Fi, Wi-Lan, and those known skilled in the art. This may be preferably a drone signal that is not a said standard signal.

As such, from the foregoing description, one skilled in the art can readily ascertain the essential characteristics of this invention, and without departing from the spirit and scope thereof, can make various changes and/or modifications of the invention to adapt it to various usages and conditions.

What is claimed is:

1. A method of aircraft traffic awareness and alertness performed by a first aircraft, the method comprising:
   receiving positional information of a target aircraft;
   measuring, by a head tracker unit, a head position;
   deriving, by a flight unit, a direction of the target aircraft relative to the head position; and
   transmitting, by the flight unit, a guiding sound signal to an output device, the guiding sound signal indicating the position of the target aircraft.

2. The method of claim 1, wherein the guiding sound signal is a three dimensional sound effect.

3. The method of claim 1, wherein the guiding sound signal is a tone modulation effect.

4. The method of claim 1, further comprising receiving a broadcast signal from the target aircraft that is formatted according to a protocol selected from the group consisting of ADS-B, ADS-R, TIS-B, Mode 3A or A, Mode C, Mode S, and Wi-fi.

5. The method of claim 1, further comprising estimating, by the flight unit, a time of collision between the first aircraft and the target aircraft by a linear interpolation of a flight path of the target aircraft based on the positional information of the target aircraft.

6. The method of claim 1, further comprising transmitting, by the flight unit, a guiding visual signal to a mobile electronic device, wherein the guiding visual signal is a three dimensional indicator of a position of the target aircraft.

7. The method of claim 1, wherein the measuring a head position includes receiving a compass measurement from a compass sensor integral to the head tracker unit.

8. The method of claim 1, wherein the measuring a head position includes receiving an inertial measurement from an inertial measurement unit integral to the head tracker unit.

9. The method of claim 1, further comprising:
receiving, by the flight unit, a voice command; and
performing a task, by the flight unit, based on the voice command.

10. The method of claim 1, wherein the positional information of the target aircraft includes a location of the target aircraft, a heading of the target aircraft, and a velocity of the target aircraft.

11. The method of claim 1, further comprising estimating a time of collision between the first aircraft and the target aircraft based on positional information of the first aircraft.

12. The method of claim 1, wherein the guiding sound signal includes an indication of an identity of the target aircraft.

13. An aircraft comprising:
a first aircraft;
a system for aircraft traffic awareness and alertness associated with the first aircraft;
a head tracker unit; and
a flight unit associated with the first aircraft, the flight unit including one or more processors and a memory storing instructions that, when executed by the one or more processors, cause the flight unit to:
receive positional information of a target aircraft;
receive a head position from the head tracker unit;
derive a direction of the target aircraft relative to the head position; and
transmit a guiding sound signal to an output device, the guiding sound signal indicating a collision warning.

14. The aircraft of claim 13, further comprising:
a positional sensor configured to generate positional information of the first aircraft,
wherein the memory stores instructions that, when executed by the one or more processors, further cause the flight unit to:
estimate, based on the positional information of the target aircraft and the positional information of the first aircraft, a time of collision between the first aircraft and the target aircraft.

15. The aircraft of claim 13, wherein the head tracker unit includes an inertial measurement unit, and the head position includes inertial measurement data received from the inertial measurement unit.

16. The aircraft of claim 13, further comprising a wireless communications unit for receiving instructions from a mobile electronic device.

17. The aircraft of claim 13, wherein the memory stores instructions that, when executed by the one or more processors, further cause the flight unit to receive a broadcast signal from the target aircraft formatted according to a protocol selected from the group consisting of: ADS-B, ADS-R, TIS-B, Mode 3A or A, Mode C, Mode S, and Wi-Fi.

18. The aircraft of claim 13, wherein the guiding sound signal is a three dimensional sound effect indicating a position of the target aircraft.

19. The aircraft of claim 13, wherein the guiding sound signal is a tone modulation effect.

20. The aircraft of claim 13, wherein the guiding sound signal includes an indication of an identity of the target aircraft.

* * * * *